United States Patent [19]

Zarrow

[11] Patent Number: 4,645,701

[45] Date of Patent: Feb. 24, 1987

[54] CREDIT CARD CARBON COPY DEFACER

[76] Inventor: Scott F. Zarrow, 247 E. 27 St., Tulsa, Okla. 74114

[21] Appl. No.: 831,840

[22] Filed: Feb. 24, 1986

[51] Int. Cl.[4] .................................. B32B 3/04

[52] U.S. Cl. .................................. 428/120; 428/121; 428/124; 428/131; 283/106; 283/98; 283/99

[58] Field of Search .............. 428/121, 122, 124, 120, 428/131; 283/98, 99, 106

*Primary Examiner*—Alexander S. Thomas

*Attorney, Agent, or Firm*—Head, Johnson & Stevenson

[57] ABSTRACT

A credit card carbon copy defacer in the form of a unitary device of relatively thin, stiff material, such as plastic or metal, having a first generally rectangular flat base portion dimensioned to fit in a billfold or shirt pocket of a user and an integrally, generally rectangular, flat portion folded along one edge of the base portion to extend generally parallel to and spaced slightly from the base portion so that a carbon paper may be received between the flat portion and the base portion, the base portion having one or more openings therein and the flat portion having protrusions in alignment with the openings so that when a carbon paper is positioned between the base portion and the flat portion and the portions manually pressed together, the part of the carbon paper at the openings is defaced.

5 Claims, 4 Drawing Figures

CREDIT CARD CARBON COPY DEFACER

THE SUMMARY OF THE INVENTION

The use of credit cards is exceedingly common and most people in the United States and other industrialized nations of the free world carry credit cards. A serious problem has developed in that unauthorized use of the credit card number may be made by a thief even without possession of the actual credit card, such as in making telephone purchases. For this reason it is exceedingly important that users maintain their credit card numbers in confidence as much as possible, within the limitations of the use of the credit card. Obviously, the portions of a credit card form which are retained by the merchant have the credit card numbers thereon but these are valuable documents within the hands of the merchants. However, the carbon papers which are an integral part of most credit card systems, are of no value and are discarded after a credit card transaction.

The typical credit card application includes a pack of forms used to record the information concerning the transaction, such as the price, merchant's name, purchaser's name and account number. These forms are typically arranged so that one is retained by the merchant, one by the customer and one is sent by the merchant to the credit card issuer. These three forms are separated by two carbon paper slips.

The merchant typically tears out the customers' copy and gives it to him and tears out the carbon copies which are discarded. Out of an abundance of precautions some merchants tear the carbon copies into smaller pieces but this alone does not prevent them from being used to obtain the customer's credit card number. Torn carbons can be reassembled by thieves. In addition, most clerical help disdains tearing carbons since they cause carbon smudges on the hands.

For these reasons most credit card transactions still result in carbons being discarded into trash, from which they can be easily retrieved by thieves and the customer's name and credit card number obtained for unauthorized use. The present invention is directed towards a small, inexpensive, and easily carried device which can be employed by a customer to deface the carbons employed in credit card transaction in a way to insure that the credit card number is defaced and in a way so that the defacing can be accomplished very expeditiously and without the physical act of tearing the carbon paper in two so as to minimize the possibility of the user being annoyed by having carbon paper smear on his fingers.

The invention is a unitary device of relatively thin, stiff material such as a plastic or metal, although plastic is preferred for the reason that, among other things, it does not cause the generation of a signal when the user passes through an airport security device. The unitary device is in the form of a generally rectangular, flat base portion dimensioned to fit in a billfold or shirt pocket of a user. The base portion has integrally attached to it a generally rectangular flat portion folded along one edge of the base portion to extend generally parallel to and slightly spaced from the base portion.

One of the portions, such as the base portion, has a recess or openings in it and the other portion, such as the flat portion, has protrusions which are in alignment with the openings. When a carbon paper is positioned between the base portion and the flat portion, the openings and protrusions are in a position occupied by the customer's credit card number. When the flat portion is manually pressed towards the base portion, the protrusions push a portion of the carbon paper through the openings, defacing some of the numbers making up the total credit card number. By this simple expedience the credit card number can not be thereafter discerned. If the user wishes to further deface the card a slight pull on the carbon paper while the flat portion is manually urged against the base portion will further deface the carbon paper. In the preferred arrangement the credit card defacing apparatus is arranged such that no additional pull on the paper is required so that the user need only handle the carbon paper gently when positioning it under the folded portion to thereby minimize the possibility of his fingers becoming smeared by the carbon paper.

A better understanding of the invention will be had by reference to the following description and claims taken in conjunction with the attached drawings.

DETAILED DESCRIPTION OF A PREFERRED EMBODIMENT

Figure 1:
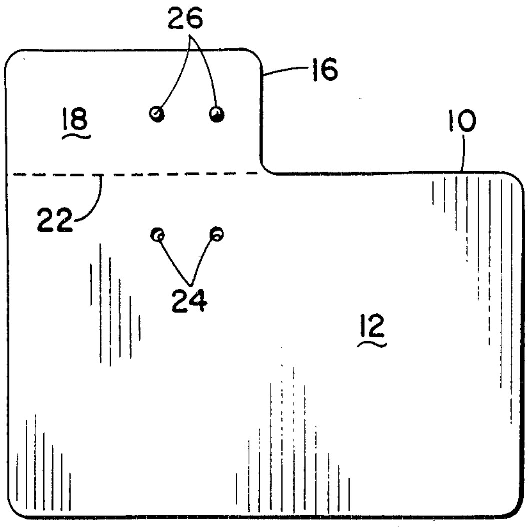
FIG. 1 is a plane view of a credit card defacer of this invention as cut from a sheet of thin stiff material, such as metal or plastic.
Figure 2:
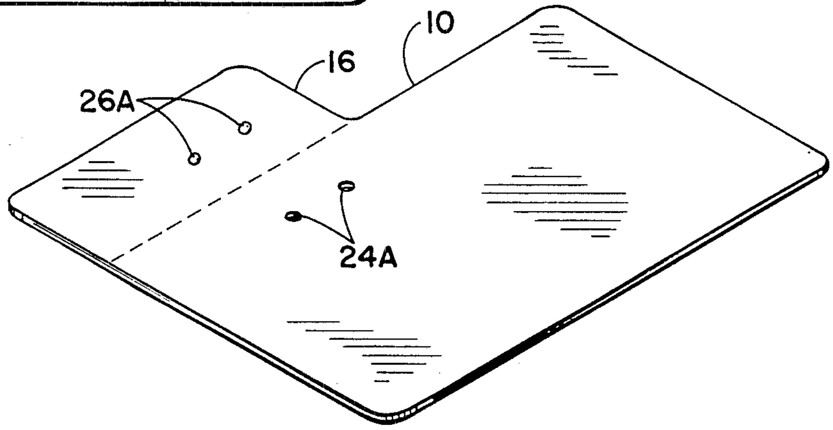
FIG. 2 is an isometric view as in FIG. 1.

Referring to the drawings, the credit card carbon defacer of this invention is preferably formed of a sheet of thin, stiff material such as metal or plastic. Plastic is preferred, however, since it has the requirements of stiffness, light-weight, strength and so forth required of the device but is non-magnetic and, therefore, will not trigger an airlines security device, thereby saving the user the inconvenience of having to remove his billfold, purse or a shirt pocket when passing through airport security. The device is formed of a flat sheet by cutting it such as in the shape identified in FIG. 1 which provides a base portion 10 having a top surface 12 and a bottom surface 14. Integrally extending from the base portion is a flap portion 16 having a top surface 18 and a bottom surface 20.

The flap portion 16 is folded at one edge of the base portion 10 along a fold line 22. In the folded position, which is the condition in which the device is carried and utilized, it has the shape as in the cross-sectional view of FIG. 3 so that the fold 22 becomes a permanent part of the device.

Formed in the base portion 10 is one or more openings 24 (two being shown although more may be employed). Formed in the flap portion 16 are protrusions 26 corresponding in number to the openings 24 and in alignment with the openings when the flat portion is in the folded position as in FIG. 3.

The openings may simply be circular as in FIG. 1 or the openings may be elliptically configured and formed partially of indentations.

Figure 3:
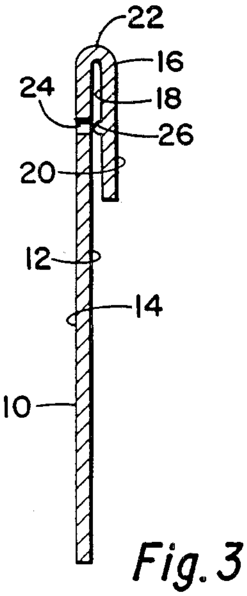
FIG. 3 is a cross-sectional view with the flat portion folded as it would be normally carried by the user and in which position it is ready to receive a credit card carbon paper between the base and the flat portion.
Figure 4:
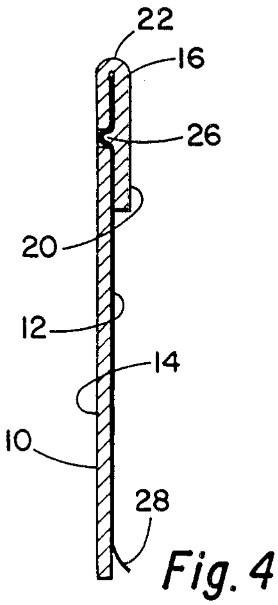
FIG. 4 is a cross-sectional view as in FIG. 3 but showing a carbon paper between the base and the flat portion and the flat portion manually urged towards the base portion to deface a part of the carbon paper which has the credit card numbers thereon.

The credit card carbon defacer is used as best illustrated in FIG. 4. As previously indicated, FIG. 3 is a cross-sectional view of the defacer as it exists and is carried by the user. When the user wishes to deface a credit card carbon paper, the carbon paper 28 is positioned between the base portion 10 and flat portion 16 with the upper edge of the carbon in contact with the fold 22 between the two portions. The user then manually presses the flat portion 16 towards the base portion 10, such as shown in FIG. 4, to cause the protrusion 26 to force a portion of the carbon paper through opening 24 thereby defacing that portion and obliterating at least a portion of the numbers making up the entire credit card number. Most credit cards have a predetermined number of numbers. MasterCard, for instance, has a total of sixteen numbers made up of a set of four numbers each with a space between each set. Visa typically includes four sets of numbers with four numbers of the first set and three in the subsequent sets. Most credit cards are arranged so that the customer's numbers are at the same distance below the upper edge of the card and this conforms to the spacing between the interior fold line 22 and the position of the openings 24 and projections 26. In order to make a card number unuseable it is only necessary to destroy one or preferably two of the numbers, that is, it is not necessary to destroy all of the numbers in the credit card number. By the use of two or more openings and corresponding projections, two or more of the numerals of the credit card number can be destroyed making the number unuseable by potential thieves.

The device of this invention is very simple, economical and convenient to use. It can be carried easily in a billfold, purse, shirt pocket or the like and if used can result in substantial savings to the user.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A credit card carbon paper defacer comprising:

a unitary device of relatively thin, stiff material such as of plastic or metal having a first generally rectangular, flat, base portion dimensioned to fit in a billfold or shirt pocket of an user and an integral generally rectangular flap portion folded along one edge of said base portion to extend generally parallel to and spaced slightly from said base portion whereby a carbon paper can be received between said flap portion and said base portion, one of said portions having at least one integral protrusion extending therefrom in the direction of the other portion and the other portion having a recess therein in alignment with said protrusion whereby when a carbon paper is positioned between said flap portion and said base portion said flap portion can be manually displaced towards said base portion, said protrusion forcing a segment of the carbon paper into said recess after which, if the carbon paper is manually pulled from said unitary device the portion of the carbon paper engaged by said protrusion will be torn away.

2. A credit card carbon paper defacer according to claim 1 including a plurality of spaced apart protrusions and a corresponding plurality of aligned recesses.

3. A credit card carbon paper defacer according to claim 1 wherein said recess is in the form of an opening.

4. A credit card carbon paper defacer according to claim 1 wherein said opening is dimensioned so that a portion of a carbon paper positioned between said portions and subject to manual force urging said portions together and the carbon paper is pulled with respect to the device a portion of the carbon paper will be caused to pass through said opening.

5. A credit card carbon paper defacer according to claim 1 in which said protrusion and said recess are complementarily configured to resist the pull of a carbon paper when said portions are pressed against each other with the carbon paper therebetween.

* * * * *